United States Patent [19]
Oka et al.

[11] Patent Number: 6,161,464
[45] Date of Patent: Dec. 19, 2000

[54] BRAKE BOOSTER

[75] Inventors: Hiroyuki Oka; Isao Kobayashi, both of Saitama-Ken, Japan

[73] Assignee: Jidosha Kiki Co., Ltd., Tokyo, Japan

[21] Appl. No.: 09/317,229

[22] Filed: May 21, 1999

[30] Foreign Application Priority Data

Jun. 19, 1998 [JP] Japan .................................. 10-172334

[51] Int. Cl.[7] .................................................. F15B 9/10
[52] U.S. Cl. ............................ 91/369.1; 91/434; 60/552
[58] Field of Search ............................. 60/552; 91/369.1, 91/376 R, 434

[56] References Cited

U.S. PATENT DOCUMENTS

| | | | |
|---|---|---|---|
| 2,796,154 | 6/1957 | Stelzer | 60/552 |
| 3,152,518 | 10/1964 | Ayers, Jr. | 91/434 |
| 3,373,662 | 3/1968 | Voll, et al. | 91/434 |
| 3,411,414 | 11/1968 | Brown, et al. | 91/434 |
| 3,534,662 | 10/1970 | Eggstein | 91/434 |
| 5,337,650 | 8/1994 | Uyama . | |
| 5,802,952 | 9/1998 | Ikeda | 60/552 |

*Primary Examiner*—F. Daniel Lopez
*Attorney, Agent, or Firm*—Flynn, Thiel, Boutell & Tanis, P.C.

[57] ABSTRACT

A brake reaction which occurs as a brake booster is actuated is prevented from being transmitted to a brake pedal, and instead pseudoction reaction imparting means 41 is provided to transmit a pseudo-reaction to the brake pedal. A valve body 5 and a power piston 3 are capable of relative movement in the axial direction, and are normally urged away from each other by a spring 8. The valve body 5 is normally urged forward by a spring 42 which is disposed within the variable pressure chamber B. This arrangement allows a variation in the advancing stroke of the brake pedal to be suppressed small if a variation occurs in the magnitude of a negative pressure which is introduced into a constant pressure chamber A as the brake booster is actuated, thus providing an improved brake feeling experienced by a driver.

3 Claims, 5 Drawing Sheets

S1: ADVANCING STROKE OF POWER PISTON 3
S2: ADVANCING STROKE OF VALVE BODY 5
(S1-S2): REDUCTION IN THE STROKE OF VALVE BODY
F: LOAD GENERATED BY SPRING 8
K: SPRING CONSTANT OF SPRING 8
P: FORWARDLY ACTING FORCE UPON VALVE BODY 5 DUE TO PRESSURE DIFFERENTIAL

S1: ADVANCING STROKE OF POWER PISTON 3
S2: ADVANCING STROKE OF VALVE BODY 5
(S1-S2): REDUCTION IN THE STROKE OF VALVE BODY
F: LOAD GENERATED BY SPRING 8
K: SPRING CONSTANT OF SPRING 8
F': LOAD GENERATED BY SPRING 42
K': SPRING CONSTANT OF SPRING 42
P: FORWARDLY ACTING FORCE UPON VALVE BODY 5 DUE TO PRESSURE DIFFERENTIAL

BRAKE BOOSTER

FIELD OF THE INVENTION

The invention relates to a brake booster, and more particularly, to a brake booster which permits an axial relative movement between a valve body and a power piston.

DESCRIPTION OF THE PRIOR ART

A brake booster is known in the art including a tubular valve body slidably disposed within a shell and having a rear end, the outer periphery of which slidably extends through an opening in the shell while maintaining a hermetic seal, a power piston mounted on the valve body, a constant and a variable pressure chamber defined across the power piston, a valve mechanism disposed within the valve body, a constant pressure passage which provides a communication between the valve mechanism and the constant pressure chamber, a variable pressure passage which provides a communication between the valve mechanism and the variable pressure chamber, an atmosphere passage which provides a communication between the valve mechanism and the atmosphere, an input shaft coupled to the valve mechanism and adapted to be driven back and forth in response to a brake pedal, and an output shaft driven forward as the valve body is driven forward, an axial relative movement being permitted between the valve body and the power piston, and the valve mechanism including a vacuum valve seat formed on the inner periphery of the valve body, a valve plunger slidably fitted into the valve body and coupled to the input shaft, an annular atmosphere valve seat formed on a rear part of the valve plunger, and a valve element urged forwardly by a spring for movement into engagement with or disengagement form the both valve seats.

In a conventional brake booster as mentioned above, as a brake pedal is depressed, the valve mechanism is operated to allow the atmosphere to be introduced into the variable pressure chamber. This allows a pressure differential between the atmosphere introduced into the variable pressure chamber and the negative pressure in the constant pressure chamber to drive the power piston and the valve body forward, thereby enabling an output to be obtained which depends on the force of depression of the brake pedal. An arrangement is made which allows an axial relative movement between the power piston and the valve body, so that when the brake booster is actuated, the stroke or the travel by which the valve body is driven forward can be reduced as compared with the stroke of the power piston. This allows the depression stroke of the brake pedal to be reduced.

In a conventional arrangement, the amount of relative movement between the power piston and the valve body as the brake booster is actuated is substantially determined by a pressure differential between the atmospheric pressure within the variable pressure chamber which acts upon the valve body to urge it rearward and the atmosphere outside the shell which acts on the valve body to urge it forwardly.

On the other hand, the brake booster is constructed such that an equal output is delivered as long as the force with which the brake pedal is depressed remains the same. However, it is to be noted that a negative pressure which is introduced into the constant pressure chamber does not remain constant, but may vary.

Accordingly, as the brake booster is actuated, a variation in the negative pressure introduced into the constant pressure chamber results in a variation in the pressure differential between the atmospheric pressure within the variable pressure chamber and the atmospheric pressure outside the shell, both of which act upon the valve body, despite the fact that a same output should be obtained when the brake pedal is depressed with the equal force. When the pressure differential varies in this manner, the amount of the relative movement between the power piston and the valve body or the depression stroke of the brake pedal varies when the same output should be delivered for the same force of depression.

It will thus be seen that in a conventional arrangement, while an equal output should be delivered for the same force of depression, a variation in the magnitude of the negative pressure introduced into the constant pressure chamber results in a varying depression stroke of the brake pedal, thus disadvantageously degrading a brake feeling experienced by a driver.

SUMMARY OF THE INVENTION

In view of the foregoing, according to the invention, there is provided a brake booster of the type mentioned above in which an arrangement is made such that a reaction applied to the output shaft is prevented from being transmitted to the valve plunger as the brake booster is actuated and pseudo-reaction imparting means is provided which transmits to the valve plunger a pseudo-reaction which depends on an output from the output shaft, the pseudo-reaction imparting means comprising a reaction piston slidably mounted on at least one of the power piston and the valve body, a second constant pressure chamber disposed rearwardly of the reaction piston and into which a pressure prevailing in the constant pressure chamber is introduced, and a second variable pressure chamber disposed forwardly of the reaction piston and into which a pressure prevailing in the variable pressure chamber is introduced, the reaction piston being urged rearward by a pressure differential between the second constant pressure chamber and the second variable pressure chamber and transmitting such force of action to the valve plunger as the pseudo-reaction, the brake booster further comprising a first spring which normally urges the valve body forward and a second spring which urges the power piston and the valve body away from each other, the first and the second spring being disposed within the variable pressure chamber.

With the described arrangement, the transmission of a reaction applied to the output shaft as the brake booster is actuated to a driver through the valve plunger, the input shaft and the brake pedal is prevented. On the other hand, the provision of the pseudo-reaction imparting means allows a pseudo-reaction which depends on an output from the output shaft to be transmitted to the brake pedal.

As the brake booster is actuated, the valve body is urged forwardly by a pressure differential between the atmospheric pressure within the variable pressure chamber acting upon the valve body to urge it rearward and the atmosphere outside the shell acting upon the valve body to urge it forward. Because the first spring is provided within the variable pressure chamber to urge the valve body forward, the valve body is urged forward by a combination of the pressure differential and the resilience of the first spring while simultaneously the second spring acts to urge the power piston and the valve body away from each other or forwardly and rearwardly. Accordingly, the contribution of the second spring which is effective to urge the valve body rearward is subtracted from the combination of the pressure differential and the first spring which is effective to urge the valve body forward.

Spring constants of the first and the second spring are chosen sufficiently high so that a variation in the forward stroke of the valve body or the depressing stroke of the brake pedal, which may occur in response to a varying negative pressure in the constant pressure chamber even though an equal output should be obtained when the brake booster is actuated, can be suppressed small. In this manner, a better brake feeling as compared with the prior art can be given to a driver.

Above and other objects, features and advantages of the invention will become apparent from the following description of an embodiment thereof with reference to the drawings.

DETAILED DESCRIPTION OF THE EMBODIMENT

Figure 1:
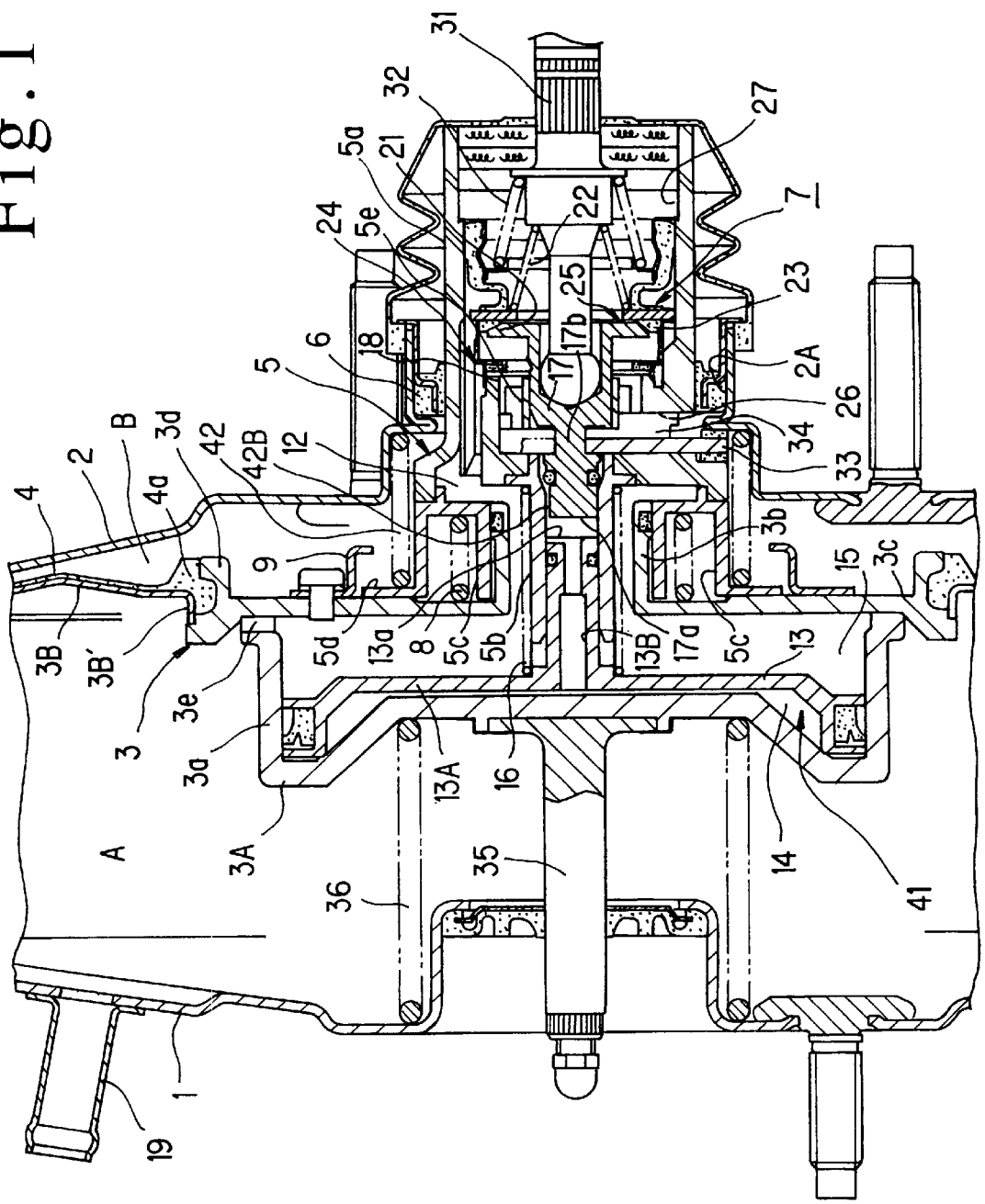
FIG. 1 is a cross section of one embodiment of the invention.

Referring to the drawings, an embodiment of the invention will now be described. Referring to FIG. 1, a brake booster includes an enclosed vessel formed by a front shell 1 and a rear shell 2 and in which a power piston 3 is mounted in an axially movable manner. In the present embodiment, the power piston 3 comprises a bottomed, tubular, stepped cylinder member 3A, and a dish-shaped plate member 3B connected to the outer periphery of the cylinder member 3A.

The stepped cylinder member 3A is disposed in the enclosed vessel so that its bottom is located on the front side while opening in the rearward direction. The cylinder member 3A includes a portion 3a of an increased diameter which is located toward the bottom and a portion 3b of a reduced diameter which is located toward the opening. The portions 3a and 3b of different diameters are joined together by a stepped end face 3c which is formed with a tubular outer periphery 3d which surrounds the portion 3b of a reduced diameter.

The tubular outer periphery 3d is formed with an annular groove in its outer peripheral surface. The plate member 3B includes a tubular inner periphery 3B', which is fitted around the tubular outer periphery 3d from the rear side to define an annular space together with the annular groove, in which a bead 4a extending around the inner periphery of a diaphragm 4 is disposed as a press fit from the rear side. In this manner, the cylinder member 3A, the plate member 3B and the bead 4a extending around the inner periphery of the diaphragm 4 are integrally connected together.

A tubular valve body 5 having a sequentially decreasing diameter in the rearward direction is disposed in a movable manner within the enclosed vessel at a location rearward of the power piston 3. As will be described in further detail later, an arrangement is provided in the present embodiment which allows a relative movement in the axial direction, or in the left-and-right direction as viewed in FIG. 1, between the power piston 3 and the valve body 5.

The valve body 5 includes a reduced diameter portion 5a at its rearmost portion, which slidably extends through an annular seal member 6 mounted within an opening 2A of the rear shell 2 to the outside thereof. The annular seal member 6 maintains a hermetic seal between the outer peripheral surface of the reduced diameter portion 5a of the valve body 5 and the opening 2A of the rear shell 2.

The valve body 5 includes an axially front portion of an increased diameter, in the front end face of which are formed a pair of annular grooves 5b, 5c concentrically. A radially outwardly extending flange 5d is formed on the outer periphery of the front end face of the valve body 5. It is to be understood that a valve mechanism 7, to be described later, is contained within the valve body 5.

The outer peripheral surface which defines the annular groove 5b of the valve body 5 is slidably fitted around the outer periphery of the portion 3b of a reduced diameter of the power piston 3 while maintaining a hermetic seal therebetween. In this manner, the flange 5d of the valve body 5 is situated between the portion 3b of a reduced diameter and the tubular outer periphery 3d of the power piston 3, allowing the front end face of the flange 5d and the stepped end face 3c of the cylinder member 3A to be disposed opposite to each other and also enabling them to abut against each other.

A spring 8 is disposed between the stepped end face 3c of the power piston 3 and the opposing bottom of the annular groove 5c of the valve body 5, thus normally urging the power piston 3 and the valve body to be spaced from each other in the axial direction.

The flange 5d of the valve body 5 is situated between the tubular outer periphery 3d and the portion 3c of a reduced diameter of the power piston 3, and an annular retainer 9 is secured to the stepped end face 3c of the power piston so as to surround the flange 5d. The flange 5d of the valve body 5 is axially movable between the inner edge of the retainer 9 and the stepped end face 3c of the power piston 3, whereby an axial relative movement between the valve body 5 and the power piston 3 is permitted to a maximum distance by which the flange 5d is axially movable with respect to the retainer 9.

The diaphragm 4 extends along the plate member 3B on the rear side thereof by having the bead 4a extending around the inner periphery thereof connected to the power piston 3 in the manner mentioned above. A bead, not shown, extending around the outer periphery of the diaphragm 4 is held sandwiched between mating parts, not shown, of the front shell 1 and the rear shell 2. In this manner, the interior of the enclosed vessel is partitioned by the diaphragm 4 into a forwardly located constant pressure chamber A and a rearwardly located variable pressure chamber B.

A reaction piston 13 is slidably fitted around the inner periphery of the portion 3a of an increased diameter of the cylinder member 3A while maintaining a hermetic seal therebetween. The reaction piston 13 comprises a disc-shaped pressure responsive area 13A which has a through-opening in its axial portion and which extends radially, and a tubular portion 13B of a reduced diameter which is disposed in alignment with the axis of the pressure responsive area 13A and extending rearward therefrom. The tubular portion 13B is slidably fitted into the inner periphery of the valve body 5 at its front portion while maintaining a hermetic seal therebetween.

The internal space of the cylinder member 3A which is located forwardly of the pressure responsive area 13A of the reaction piston 13 defines a second variable pressure chamber 14 while the internal space of the cylinder member 3A which is disposed rearward of the pressure responsive area 13A of the reaction piston 13 defines a second constant pressure chamber 15.

The second constant pressure chamber 15 is maintained in communication with the constant pressure chamber A through a radial opening 3e formed in the portion 3a of a reduced diameter, and is also in communication with the valve mechanism 7 through a constant pressure passage 12 formed in the valve body 5. On the other hand, the second variable pressure chamber 14 communicates with the valve mechanism 7 through the internal space within the tubular portion 13B, the internal space within the valve body 5 and its continuing axial opening 5e.

A spring 16 is disposed within the second constant pressure chamber 15 between the end face of the pressure responsive area 13A and the valve body 5, thus urging the reaction piston 13 and the valve body 15 in a direction away from each other or in left-and-right direction, while simultaneously urging the reaction piston 13 normally forward within the portion 3a of an increased diameter.

As will be described in detail later, in the inoperative condition of the brake booster shown in FIG. 1, the resilience of the spring 16 causes the reaction piston 13 to be located at its front end within the portion 3a of an increased diameter. At this time, a clearance is maintained between the rear end face 13a of the tubular portion 13B of the reaction piston 13 and the opposing end face 17a of the valve plunger 17.

Figure 2:
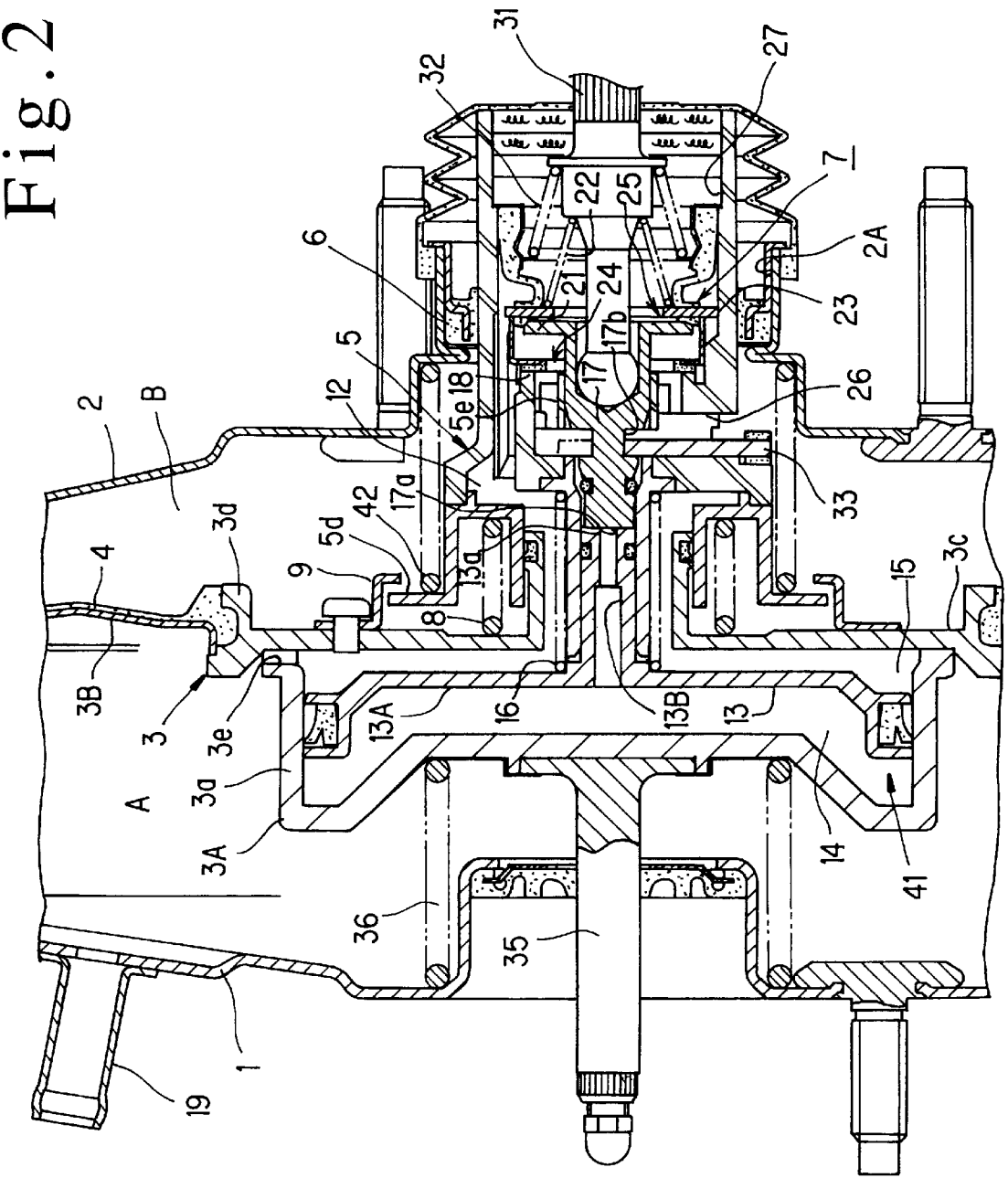
FIG. 2 is a cross section of a brake booster shown in FIG. 1, illustrating its operational phase.

By contrast, when the brake booster is actuated as illustrated in FIG. 2, the reaction piston 13 moves rearward within the portion 3a of an increased diameter, whereby the end face 13a of the tubular portion 13B of the reaction piston 13 abuts against the end face 17a of the valve plunger 17, thus transmitting the force which urges the reaction piston 13 rearward as a pseudo-reaction to a brake pedal, not shown.

The valve mechanism 7 which switches a fluid circuit is contained in the portion 5a of a reduced diameter of the valve body 5. The valve mechanism 7 comprises an annular vacuum valve seat 18 formed on a step on the inner peripheral surface of the valve body 5, the valve plunger 17 which is slidably fitted into the valve body 5 from the rear side, an annular atmosphere valve seat 21 formed on a rear end of the valve plunger 17, and a valve element 23 urged by a spring 22 from the rear side or from the right-hand side as viewed in FIG. 1, so as to be seated upon either valve seat 18, 21. A combination of the vacuum valve seat 18 and a first seat area on the valve element 13 which moves into engagement with or disengagement from the valve seat 18 defines a vacuum valve 24, and a combination of the atmosphere valve seat 21 and a second seat area on the valve element 23 which moves into engagement with or disengagement from the valve seat 21 defines an atmosphere valve 25.

A space located radially outward of the vacuum valve seat 18 is maintained in communication with the constant pressure chamber A through the constant pressure passage 12 formed in the valve body 5, the second constant pressure chamber 15 formed by the cylinder member 3A and the radial opening 3e. The constant pressure chamber A communicates with an intake manifold of an engine through a tubing 19 which is mounted on the front shell 1 for introducing a negative pressure. Accordingly, the negative pressure is normally introduced into the constant pressure chamber A, the second constant pressure chamber 15 and the constant pressure passage 12. It is to be noted that in the present embodiment, the constant pressure passage 12 comprises the annular groove 5b in the valve body 5, and an axial opening which continues from the annular groove and extends rearward to open into a step at a location adjacent to and outward of the vacuum valve seat 18.

A space located intermediate between the vacuum valve seat 18 and the atmosphere valve seat 21 communicates with the variable pressure chamber B through a radial variable pressure passage 26 formed in the valve body 5. Finally, a space located radially inward of the atmosphere valve seat 21 communicates with the atmosphere through an atmosphere passage 27 formed in the valve body 5.

The valve plunger 17 has its rear end pivotally connected with the front end of an input shaft 31, and a spring 32 having a greater resilience than the spring 22 is disposed between the input shaft 31 and the valve body 5. As a consequence, in the inoperative condition of the brake booster as shown in FIG. 1, the atmosphere valve 25 is closed while the vacuum valve 24 is open. The other end of the input shaft 31 is coupled to a brake pedal, not shown.

A key member 33 is engaged with the valve plunger 17 to prevent the valve plunger 17 from being disengaged from the valve body 5 in the rearward direction. The key member 33 is known in the art, and is forked at its central portion to extend to its free ends. The key member 33 is inserted into an opening 34 which is formed diametrically in the valve body 5, with the forked portions engaging with a portion 17b of a reduced diameter of the valve plunger 17.

In the present embodiment, the opening 34 into which the key member 33 is inserted and the variable pressure passage 26 are formed integrally so as to be adjacent to each other in the axial direction of the valve body 5. The opening 34 has a width, as measured in a direction orthogonal to the axis of the valve body 5 and also orthogonal to the direction in which the key member 33 is inserted into the opening 34, which is greater than the corresponding width of the variable pressure passage 27 as measured in the same direction, whereby the key member 33 is displaceable axially of the valve body 5 only within the opening 34.

The key member 33 and the valve plunger 17 are displaceable axially of the valve body 5 in an extent defied by the axial length of the portion 17b of a reduced diameter. In the inoperative condition of the brake booster as shown in FIG. 1, the key member 33 is maintained in abutment against the wall of the rear shell 2, thus maintaining the key member 33 and the valve plunger 17 at advanced positions relative to the valve body 5. This allows a lost motion of the input shaft 31 to be reduced at the commencement of operation of the brake booster.

The outer periphery of the valve plunger 17 at a location forward of the portion 17b of a reduced diameter which is engaged by the key member 33 has a reduced size as compared with the inner periphery of the valve body 5 in a region where it is fitted. Accordingly, a clearance is maintained between the outer periphery of the valve plunger 17 and the inner periphery of the valve body 5 to maintain a communication between the variable pressure chamber B and the second variable pressure chamber 14 through the variable pressure passage 26, the clearance between the inner peripheral surface of the valve body 5 and the outer peripheral surface of the valve plunger 17, the internal space within the valve body 5 which continues therefrom and the internal space within the reaction piston 13 (cylinder portion 13B).

In the inoperative condition of the brake booster as shown in FIG. 1, the end face 13a of the reaction piston 13 and the end face 17a of the valve plunger 17, which oppose each other, are spaced apart.

By contrast, when the brake booster is actuated as shown in FIG. 2, the reaction piston 13 moves rearward within the portion 3a of an increased diameter and its rear end face 13a abuts against the end face 17a of the valve plunger 17, whereby the force which urges the reaction piston 13 rearward can be transmitted as a pseudo-reaction to a driver through a brake pedal, not shown.

An output shaft 35 is disposed within the constant pressure chamber A and has a front end which projects externally of the front shell 1 for connection with a piston of a master cylinder, not shown.

The rear end of the output shaft 35 is connected to the bottom of the cylinder member 3A at its center. Accordingly, a brake reaction which acts on the output shaft 35 when the brake booster is actuated is transmitted to the cylinder member 3A or the power piston 3. When the flange 5d of the valve body 5 is not in abutment against the stepped end face 3c of the power piston 3, the brake reaction is prevented from being transmitted to the valve body 5, and is simultaneously prevented from being transmitted to a brake pedal through the valve plunger 17.

A return spring 36 is disposed between the bottom of the cylinder member 3A (or power piston 3) and the wall of the front shell 1, whereby in the inoperative condition of the brake booster, the spring 8 is compressed by the power piston 3 which is urged rearward by the return spring 36 to bring the end face of the flange 5d of the valve body 5 and the stepped end face 3c of the cylinder member 3A of the power piston 3 into abutment against each other. Under this condition, the valve body 5 abuts against the key member 33 which in turn abuts against the wall of the rear shell 2.

In the present embodiment, an arrangement is made so that a brake reaction acting on the output shaft 35 is prevented from being transmitted to a brake pedal, as mentioned previously, thus disabling a driver to obtain a brake feeling. Accordingly, in the present embodiment, pseudo-reaction imparting means 41 is provided so that a pseudo-reaction which depends on the magnitude of the force of depressing the brake pedal can be imparted to a driver.

Specifically, the pseudo-reaction imparting means 41 comprises the reaction piston 13, and the second constant pressure chamber 15 and the second variable pressure 14 which are disposed across the reaction piston 13.

In the inoperative condition of the brake booster as shown in FIG. 1, the end face 13a of the tubular portion 13B of the reaction piston 13 is slightly spaced from the end face 17a of the valve plunger 17.

By contrast, when the brake booster is actuated as shown in FIG. 2 by driving the power piston 3 and the valve body 5 forward to move the key member 33 away from the wall of the rear shell 2, the end face 13a of the tubular portion 13B of the reaction piston 13 abuts against the end face 17a of the valve plunger 17, whereby the force which urges the reaction piston 13 rearward can be transmitted as a pseudo-reaction to a brake pedal through the valve plunger 17 and the input shaft 31.

In the present embodiment, a spring 42 is disposed between the wall of the rear shell 2 and the flange 5d of the valve body 5 within the variable pressure chamber B and normally urges the valve body 5 forward.

When the brake booster is inoperative, the resilience of the return spring 36 causes the spring 42 and the spring 8 which is disposed inside thereof to be compressed, whereby the flange 5d of the valve body 5 abuts against the stepped end face 3c of the power piston 3 and the valve body 5 abuts against the key member 33.

Thus it will be seen that in the present embodiment, the power piston 3 is normally urged rearward by the return spring 36 while the valve body 5 is normally urged forward by the spring 42. The valve body 5 and the power piston 3 are normally urged to be axially spaced away from each other by the spring 8. As illustrated in FIG. 1, spring constants of the spring 42 and the spring 8 which is disposed inside thereof are chosen to be as large as possible within an extent defined by a requirement that the resilience of the return spring 36 causes a compression of the springs 42 and 8 to allow the stepped end face of the power piston to abut against the flange 5d of the valve body 5 and to allow the valve body 5 to abut against the key member 33.

As will be described in further detail later, an arrangement that the spring 42 is disposed within the variable pressure chamber B and higher spring constants are given to the springs 42 and 8 allows a variation in the forward stroke of the brake pedal to be suppressed small in the event the negative pressure which is introduced into the constant pressure chamber A varies as the brake booster is actuated.

DESCRIPTION OF OPERATION

In the described arrangement, in the inoperative condition of the brake booster as shown in FIG. 1, the atmosphere valve 25 is closed while the vacuum valve 24 is open. Accordingly, the constant pressure chamber A communicates with the variable pressure chamber B, and the negative pressure is introduced into the both chambers.

As a consequence, the negative pressure is also introduced into the second variable pressure chamber 14 and the second constant pressure chamber 15. The resilience of the return spring 36 urges the valve body 5 and the power piston 3 to be retracted rearward, and the key member 33 abuts against the wall of the rear shell 2. The resilience of the return spring 36 also causes a compression of the spring 8, 42, whereby the flange 5d of the valve body 5 and the stepped end face 3c of the power piston 3 are brought into abutment against each other, and under this condition, the stepped end face of the valve body 5 abuts against the key member 33. Also at this time, the reaction piston 13 is located at its foremost position within the portion 3a of an increased diameter under the influence of the resilience of the spring 16, and the rear end face 13a of the reaction piston 13 is slightly spaced from the end face 17a of the valve plunger 17.

If the brake pedal is now depressed to drive the input shaft 31 and the valve plunger 17 forward, the atmosphere valve 15 is opened while the vacuum valve 24 is closed.

In response thereto, the atmosphere is introduced into the variable pressure chamber B, and the pressure differential between the negative pressure within the constant pressure chamber A and the atmospheric pressure within the variable pressure chamber B drives the power piston 3 forward. This allows the output shaft 35 to be driven forward integrally with the power piston 3, thus generating a braking liquid pressure within a master cylinder (FIG. 2). At this time, a brake reaction which results from the braking liquid pressure as transmitted through the output shaft 35 is accepted in its entirety by the power piston 3, and hence cannot be transmitted to the valve plunger 17 or to a brake pedal, not shown. As will be described in further detail later, in the inoperative condition of the brake booster and immediately after its actuation, the spring 8 is compressed to cause the flange 5d of the valve body 5 to abut against the stepped end face 3c of the power piston 3, thus causing them to be driven forward in an integral manner. However, as the atmosphere continues to be introduced into the variable pressure chamber B, the force with which the valve body 5 is urged forwardly due to the pressure differential between the atmospheric pressure within the variable pressure chamber B and the atmospheric pressure outside the brake booster is reduced. Consequently, with a continued introduction of the atmosphere into the variable pressure chamber B, the resilience of the spring 8 is effective to space the flange 5d of the valve body 5 from the stepped end face 3c of the power piston 3 as shown in FIG. 2, thus reducing the forward stroke of the valve body 5 and the input shaft 31 relative to the forward stroke of the power piston 3.

On the other hand, when the atmosphere is introduced into the variable pressure chamber B, it is also introduced into the second variable pressure chamber 14, whereby the reaction piston 13 is driven rearward relative to the portion 3a of an increased diameter under the influence of the pressure differential between the negative pressure in the second constant pressure chamber 15 and the atmospheric pressure in the second variable pressure chamber 14.

As mentioned previously, a clearance is maintained between the end face 13a of the reaction piston 13 and the end face 17a of the valve plunger 17 in the inoperative condition shown in FIG. 1 where the key member 33 abuts against the inner wall of the rear shell 2 and also immediately after the power piston 3 is driven forward, and accordingly, a pseudo-reaction which is acting on the reaction piston 13 cannot be transmitted to the valve plunger 17.

By contrast, the pressure differential between the constant pressure chamber A and the variable pressure chamber B acts upon the valve body 5 also, whereby the valve body 5 is also driven forward as the power piston 3 is driven forward. When the valve body 5 is driven forward and the key member 33 moves away from the wall of the rear shell 2, the key member 35 is allowed to retract relative to the valve body 5, while the reaction piston 13 is driven rearward with respect to the portion 3a of an increased diameter, thus causing the end face 13a of the reaction piston 13 to abut against the opposing end face 17a of the valve plunger 17 (FIG. 2). In this manner, the force which urges the reaction piston 13 is transmitted as a pseudo-reaction to a brake pedal, not shown, through the valve plunger 17 and the input shaft 31.

In a servo balance condition reached in an intermediate load region of the brake booster, a balance is reached for the power piston 3 between the retracting force produced by the brake reaction from the output shaft 35 and the resilience of the return spring 36 and the advancing force produced by the pressure differential between the constant pressure chamber A and the variable pressure chamber B.

A balance is also reached for the valve body 5 between the retracting force produced by the resilience of the springs 8 and 16 and the advancing force produced by the pressure differential between the second constant pressure chamber 15 and the variable pressure chamber B and the resilience of the spring 42.

A balance is also reached for the reaction piston 13 between the retracting force produced by the pressure differential between the second constant pressure chamber 15 and the second variable pressure chamber 14 and the advancing force produced by the resilience of the spring 16 and the depression of the brake pedal by a driver or the advancing force of the valve plunger 17.

It will be understood from the servo balance condition that the amount of relative movement of the power piston 3 and the valve body 5 with respect to the brake pedal depressing force or the output from the brake booster can be determined in terms of parameters of the springs 8, 16 and 42 and the pressure responsive areas. In the present embodiment, an axial relative movement between the power piston 3 and the valve body is permitted, and this reduces the stroke by which the valve body 5 is advanced with respect to the stroke by which the power piston 3 is advanced.

In other words, it is necessary that the output shaft 35 which is subject to the brake reaction be advanced through a relatively large stroke in order to compensate for a piston stroke of a master cylinder, not shown, that is, a stroke from the beginning of an advancing movement of the piston of the master cylinder until a braking liquid pressure increases substantially. By contrast, in the present embodiment, the amount of relative movement between the power piston 3 and the valve body 5 can be determined in accordance with the output from the brake booster, and this allows the stroke by which the valve body is advanced to be reduced with respect to the stroke by which the power piston 3 is advanced. As a consequence, the stroke of the input shaft 31, and hence its coupled brake pedal, which is driven forward as the valve body 5 is driven forward, can be reduced in a relative sense, thereby improving the brake feeling.

Figure 3:
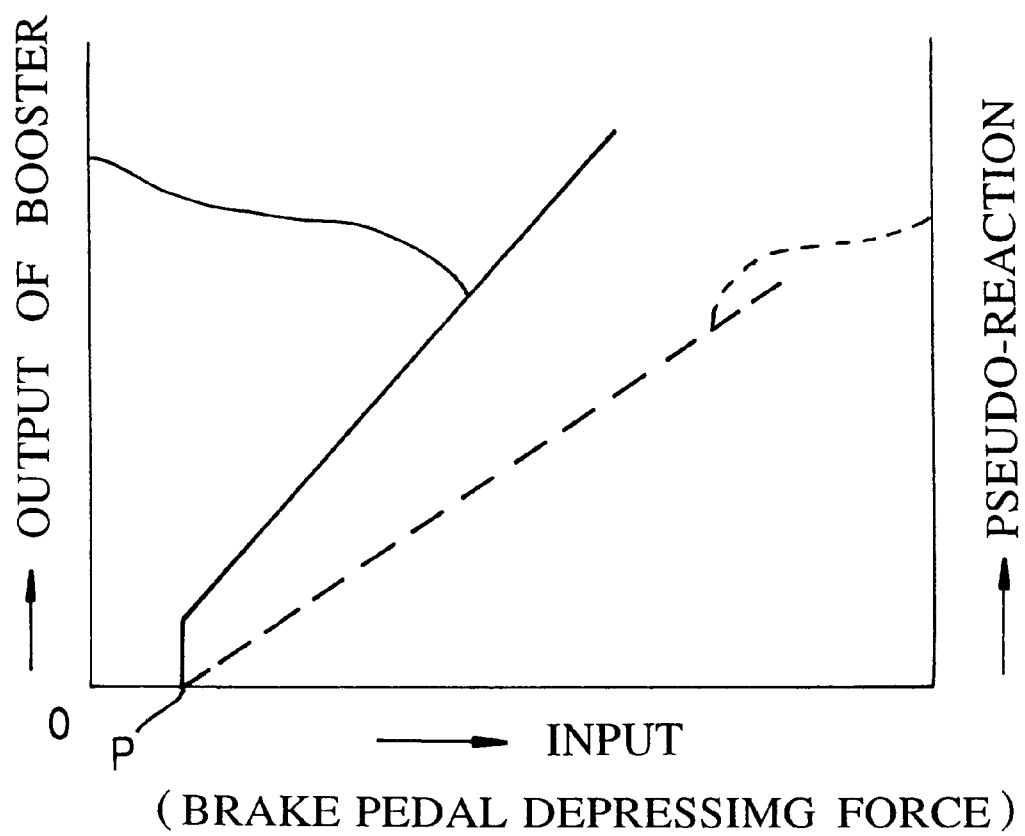
FIG. 3 graphically shows a characteristic curve of the embodiment.

FIG. 3 graphically illustrates a relationship between the brake pedal depressing force and the pseudo-reaction which is transmitted to a driver. In FIG. 3, a point P represents the time when the end face 13a of the reaction piston 13 abuts against the end face 17a of the valve plunger 17.

Thus, in the present embodiment, at the commencement of depression of the brake pedal, the end face 13a of the reaction piston 13 is spaced from the end face 17a of the valve plunger 17, and the pseudo-reaction begins to be transmitted to a driver from the time on when the brake booster is actuated to bring the end face 13a of the reaction piston 13 into abutment against the end face 17a of the valve plunger 17.

As mentioned previously, a balance is reached for the reaction piston 13 between the retracting force produced by the pressure differential between the second constant pressure chamber 15 and the second variable pressure chamber 14 and the advancing force produced by the resilience of the spring 16 and the brake pedal depressing force from a driver or the advancing force of the valve plunger 17. Accordingly, the retracting force produced by the pressure differential between the second constant pressure chamber 15 and the second variable pressure chamber 14 is principally transmitted as a pseudo-reaction to the brake pedal. The pseudo-reaction corresponds to the pressure differential between the second constant pressure chamber 15 and the second variable pressure chamber 14, which in turn corresponds to the pressure differential between the constant pressure chamber A and the variable pressure chamber B, which in turn corresponds to the force with which the brake pedal is depressed.

Accordingly, even though a reaction disc which is usually provided in a conventional brake booster is omitted, a jumping response is available in the present embodiment as in a conventional brake booster from the time on when the end face 13a of the piston 13 is brought into abutment against the end face 17a of the valve plunger 17, subsequently transmitting a pseudo-reaction which depends on the depression of the brake pedal to a driver. This improves the brake feeling experienced by a driver in comparison to an arrangement in which the pseudo-reaction is immediately transmitted to a driver upon initiation of depression of the brake pedal.

Quick Braking Operation

A quick braking operation remains basically the same as the normal operation, but it is to be noted that in the present embodiment, the second variable pressure chamber 14 and the variable pressure passage 26 communicate with each other through an internal space within the reaction piston 13 (defined by the inner peripheral surface of the tubular member 13B) and a clearance between the inner peripheral surface of the valve body 5 and the outer periphery of the valve plunger 17, which is substantially an orifice passage. Accordingly, during a quick braking operation, namely, when the pressure prevailing in the variable pressure passage 26 and the variable pressure chamber B increases rapidly, the pressure in the second variable pressure passage 14 will rise in retarded relationship to the pressure rise which occurs in the variable pressure chamber B. As a consequence, a pseudo reaction which is imparted by the pseudo-reaction imparting means 41 to the brake pedal will be reduced during the quick braking operation as compared with that occurring during the normal braking operation, thus avoiding an abnormally high rise during the quick braking operation, as would be found for a brake reaction in a conventional arrangement. This allows a braking force of an increased magnitude to be obtained with a relatively low force of depression during the quick braking operation, thus enabling a powerless driver such as an aged or a female driver to exercise a quick braking operation in a positive manner.

In the present embodiment, the spring 42 is disposed within the variable pressure chamber B, whereby a variation in the advancing stroke of the valve body 5 and the input shaft 31 can be suppressed small if there occurs a variation in the magnitude of the negative pressure introduced into the constant pressure chamber A between a previous and a current operation as the brake booster is actuated.

By contrast, supposing an arrangement in which the spring 42 is omitted from the described embodiment, an inconvenience is caused, as mentioned below. Specifically, when the brake booster is actuated as illustrated in FIG. 2, a force which results from a pressure differential between the atmosphere which is introduced into the variable pressure chamber B and an atmospheric pressure outside the brake booster urges the valve body 5 forward. If the magnitude of the negative pressure which is introduced into the constant pressure chamber A has varied from the magnitude which prevailed during a previous operation, there results a different magnitude of force acting on the valve body 5 which is produced by the pressure differential between the atmospheric pressure within the variable pressure chamber B and the outside atmospheric pressure. A different magnitude of the force produced by the differential pressure means that the advancing stroke of the valve body 5 and the input shaft 31 or the depressing stroke of the brake pedal from its unactuated condition becomes different. Accordingly, there occurs a different depressing stroke of the brake pedal during the current operation from a corresponding stroke during a previous operation even though a same output is obtained, thus degrading the brake feeling experienced by a driver.

The provision of the spring 42 in the variable pressure chamber B in the present embodiment eliminates the described inconvenience. A difference in the depressing stroke of the brake pedal which occurs between the absence and the presence of the spring 42 as in the present embodiment will now be described.

Figure 4:
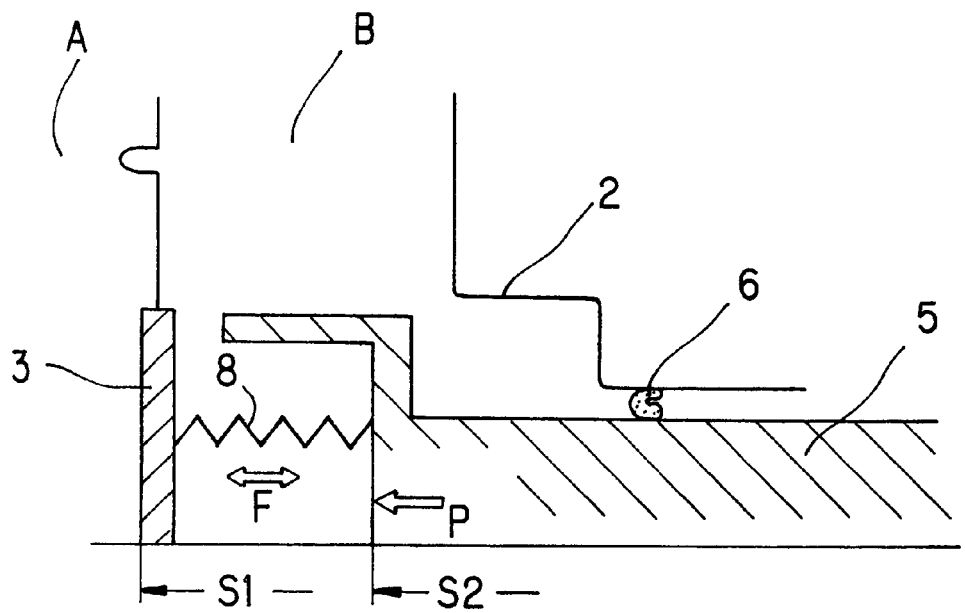
FIG. 4 is a schematic view of the prior art.

FIG. 4 is a schematic illustration for the absence of the spring 42. In this instance, a reduction (S1–S2) in the depressing stroke of the brake pedal is substantially determined by spring constant K of the spring 8. In other words, when a reduction (S1–S2) in the depressing stroke of the brake pedal is chosen to a given value, the spring constant K of the spring 8 is determined to a corresponding value. Accordingly, if the spring constant K of the spring 8 is small, in the event there is a variation in the negative pressure which is introduced into the constant pressure chamber A between a previous and the current operation as the brake booster is actuated, a resulting variation in the force P which urges the valve body 5 forward between the previous and the current operation causes a larger variation in the compression of the spring 8. This means that there results a larger variation in the reduction (S1–S2) of the depressing stroke of the brake pedal. If the spring constant K of the spring 8 could be increased, a variation in the reduction (S1–S2) in the stroke can be suppressed, but this is inhibited because the value of the spring constant K is determined when the reduction (S1–S2) of the stroke is initially determined, as mentioned above.

Figure 5:
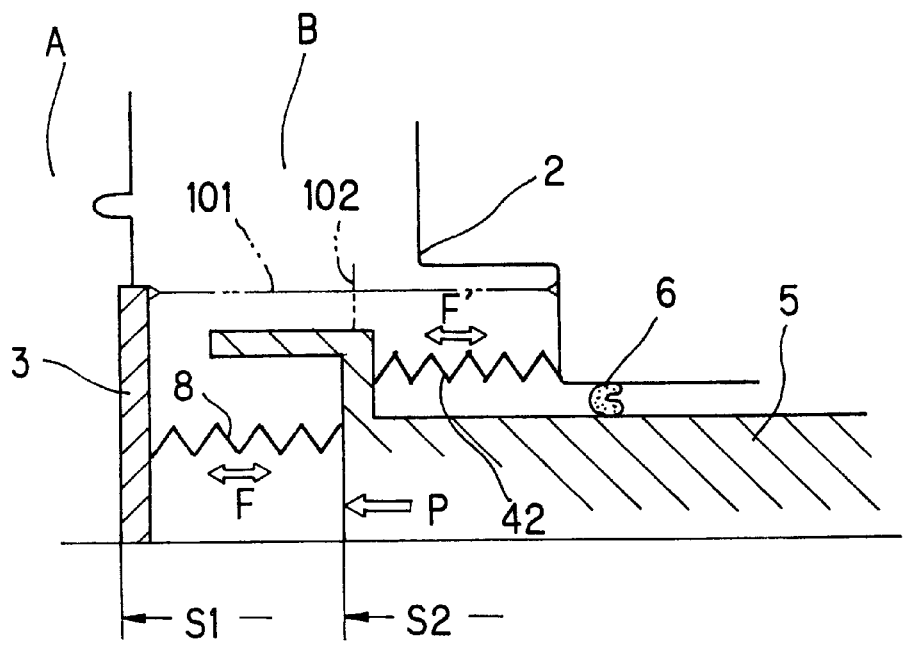
FIG. 5 is a schematic view illustrating the principal part of the embodiment shown in FIG. 1.

FIG. 5 is a schematic illustration of the present embodiment in which the spring 42 normally urges the valve body 5 forward. This arrangement is equivalent to disposing a single coiled spring 101 between the power piston 3 and the wall of the rear shell 2 and connecting a central point on the coiled spring 101 to the valve body 5 by means of a bracket 102. In this instance, it is possible to determine a reduction (S1–S2) in the depressing stroke of the brake pedal depending on the point on the coiled spring 101 where it is secured to the valve body 5 by the bracket 102. Accordingly, it is possible in the present embodiment to choose higher values for the spring constants K, K' of the springs 8, 42. This allows a variation in the compression of the spring 8 which is caused by a variation in the force P which urges the valve body 5 forward between the previous and the current operation to be reduced if there occurs a variation in the magnitude of the negative pressure introduced into the constant pressure chamber A between the previous and the current operation as the brake booster is actuated.

Accordingly, as compared with an arrangement which lacks the spring 42, it is possible in the present embodiment to suppress a variation in the advancing stroke of the valve body 5 in response to a variation in the magnitude of the negative pressure introduced into the constant pressure chamber A. As a consequence, if there occurs a variation in the negative pressure introduced into the constant pressure chamber A, a resulting variation in the advancing stroke of the brake pedal can be suppressed small.

As a consequence, if there is a variation in the negative pressure introduced into the constant pressure chamber A as the brake booster is actuated, if an equal output can be obtained, a variation in the advancing stroke of the brake pedal can be reduced. An overall effect is that the brake feeling experienced by a driver can be improved according to the present embodiment when it is compared with an arrangement which lacks the spring 42.

While the invention has been described in detail above in connection with a preferred embodiment thereof, it should be understood that a number of changes, modifications and substitutions therein are possible from the above disclosure without departing from the spirit and the scope of the invention defined by the appended claims.

What is claimed is:

1. A brake booster including a tubular valve body slidably disposed within a shell and having a rear end, the outer periphery of which slidably extends through an opening in the shell while maintaining a hermetic seal, a power piston mounted on the valve body, a constant and a variable pressure chamber defined across the power piston, a valve mechanism disposed within the valve body, a constant pressure passage which provides a communication between the valve mechanism and the constant pressure chamber, a variable pressure passage which provides a communication between the valve mechanism and the variable pressure chamber, an atmosphere passage which provides a communication between the valve mechanism and the atmosphere, an input shaft coupled to the valve mechanism and adapted to be driven back and forth in response to a brake pedal, and an output shaft driven forward as the valve body is driven forward, an axial relative movement being permitted between the valve body and the power piston, and the valve mechanism including a vacuum valve seat formed on the inner periphery of the valve body, a valve plunger slidably fitted into the valve body and coupled to the input shaft, an annular atmosphere valve seat formed on a rear part of the valve plunger, and a valve element urged forwardly by a spring for movement into engagement with or disengagement from both said valve seats;

characterized by an arrangement which prevents a reaction applied to the output shaft as the brake booster is actuated from being transmitted to the valve plunger, in combination with pseudo-reaction imparting means which transmits a pseudo-reaction which depends on an output from the output shaft to the brake pedal;

the pseudo-reaction imparting means comprising a reaction piston slidably mounted on at least one of the power piston and the valve body, a second constant pressure chamber disposed rearward of the reaction piston and into which a pressure in the constant pressure chamber is introduced, and a second variable pressure chamber disposed forward of the reaction piston and into which a pressure in the variable pressure chamber is introduced, the reaction piston being urged rearward by a pressure differential between the second constant pressure chamber and the second variable pressure chamber to transmit the force with which it is urged as a pseudo-reaction to the valve plunger;

further characterized by a first spring which normally urges the valve body forward and a second spring which urges the power piston and the valve body away from each other, the first and the second spring being disposed in the variable pressure chamber.

2. A brake booster according to claim 1 in which the power piston comprises a bottomed, tubular cylinder member having an opening which faces rearward, and a plate member connected to the outer periphery of the cylinder member, the cylinder member including a front portion of an increased diameter and a rear portion of a reduced diameter, with a stepped end face disposed at a boundary therebetween;

the valve body including a front end face in which a pair of inner and outer annular grooves are formed concentrically and which has a flange extending radially outward from the outer periphery thereof;

the reaction piston including a pressure responsive area having a through-opening in its axial portion and extending radially, and a tubular portion of a reduced diameter which extends rearward from the pressure responsive area;

the rear portion of a reduced diameter of the cylinder member being slidably fitted into the inner annular groove in the valve body;

the second spring being disposed between the stepped end face of the cylinder member and the bottom of the outer annular groove in the valve body;

the first spring being disposed between the flange of the valve body and the opposing rear wall of the shell;

the pressure responsive area of the reaction piston being slidably fitted into the front portion of an increased diameter of the cylinder member while the tubular portion of the reaction piston is slidably fitted into the inner periphery of the valve body at its front end, with the rear end face of the tubular portion of the reaction piston being disposed in opposing relationship with the front end face of the valve plunger;

a space within the front portion of an increased diameter of the cylinder member which is located rearward of the pressure responsive area of the reaction piston being defined as the second constant pressure chamber while a space within the front portion of an increased diameter of the cylinder member which is located forward of the pressure responsive area of the reaction piston is defined as the second variable pressure chamber;

a third spring being disposed between the pressure responsive area of the reaction piston and the bottom of the inner annular groove of the valve body to urge the reaction piston and the valve body away from each other;

the output shaft being connected to the bottom of the power piston;

and a return spring being disposed between the bottom of the power piston and a front wall of the shell to maintain the power piston at its inoperative position.

3. A brake booster according to claim 2 in which the second variable pressure chamber and the variable pressure passage communicate with each other through an internal space within the reaction piston, an internal space within the valve body which is located rearward of the reaction piston, and a clearance between the inner peripheral surface of the valve body and the outer periphery of the valve plunger at a location rearward of the internal space within the valve body, whereby during a quick braking operation in which the input shaft is rapidly driven forward, a pressure rise in the second variable pressure chamber occurs in retarded relationship with respect to a pressure rise in the variable pressure chamber.

* * * * *